United States Patent [19]

Kuehn et al.

[11] 3,923,509

[45] Dec. 2, 1975

[54] WATER-SOLUBLE POLYESTER RESINS AS BINDERS FOR PHOTOCONDUCTORS

[75] Inventors: Erich Kuehn, Wilmington; John R. Wyhof, Newark, both of Del.

[73] Assignee: ICI United States Inc., Wilmington, Del.

[22] Filed: Oct. 10, 1974

[21] Appl. No.: 513,887

Related U.S. Application Data

[62] Division of Ser. No. 362,539, May 21, 1973, Pat. No. 3,865,869.

[52] U.S. Cl. ................................. 96/1.8; 96/1.5
[51] Int. Cl.$^2$ ..................... G03G 5/06; G03G 5/08
[58] Field of Search ........ 96/1.5, 1.8; 428/480, 481, 428/483; 260/47 C, 47 UA, 49

[56] References Cited

UNITED STATES PATENTS

| | | | |
|---|---|---|---|
| 3,000,775 | 9/1961 | Shaw et al. | 428/480 |
| 3,128,204 | 4/1964 | Schaum et al. | 96/1.8 X |
| 3,309,222 | 3/1967 | Caldwell | 428/480 |
| 3,423,280 | 1/1969 | Wiener | 428/481 X |
| 3,508,951 | 4/1970 | Shimp et al. | 428/480 X |
| 3,579,477 | 5/1971 | Vess | 428/481 X |
| 3,701,680 | 10/1972 | Lee et al. | 428/480 |
| 3,703,371 | 11/1972 | Merrill | 96/1.5 X |
| 3,703,372 | 11/1972 | Merrill | 96/1.5 X |
| 3,709,684 | 1/1973 | Feltzin | 96/1.8 X |
| 3,754,909 | 8/1973 | Feltzin et al. | 96/1.5 |

FOREIGN PATENTS OR APPLICATIONS

| | | | |
|---|---|---|---|
| 4,319,191 | 8/1968 | Japan | 96/1.8 |

Primary Examiner—Roland E. Martin, Jr.

[57] ABSTRACT

Dielectric resins which are soluble in water are disclosed. The resins comprise amine salts of polyester resins, which resins are prepared by reacting a dicarboxylic acid with a polyol blend of two polyols.

These resins have been found to be particularly useful in the preparation of electrographic and electrophotographic recording elements.

12 Claims, No Drawings

WATER-SOLUBLE POLYESTER RESINS AS BINDERS FOR PHOTOCONDUCTORS

This is a division of application Ser. No. 362,539, filed May 21, 1973 now U.S. Pat. No. 3,865,869.

BACKGROUND OF THE INVENTION

1. Field of the Invention

The present invention relates generally to dielectric resins. More particularly, the invention relates to water-soluble amine salts of dielectric resins and to electrographic and electrophotographic recording elements prepared from said resins.

Description of the Prior Art

Dielectric resins are known in the art. As used herein, the term dielectric resins refers to those materials which are insulators or non-conductors of electricity and will, therefore, accept and maintain an electric charge applied to them.

One use for dielectric resins is in recording elements useful in electrostatic imaging processes. As used herein, the term electrostatic is intended to refer to both electrographic and electrophotographic recording processes as hereinafter defined.

Electrographic recording elements are well known in the art. These recording elements generally comprise a base support having coated thereon a layer of a dielectric material. Resins suitable for use in the dielectric layers are also known in the prior art. See, in this regard, U.S. Pat. No. 3,639,640 issued to Gager; U.S. Pat. No. 3,385,730 issued to Relph; U.S. Pat. No. 3,634,135 issued to Akiyama; and U.S. Pat. No. 3,653,894 issued to Levy et al.

The electrographic recording elements are useful in what is generally referred to as an electrographic printing process to provide a permanent record of the information generated by such a process. Although the details of the recording processes involved are not necessary to a complete understanding of the present invention which is related only to resins useful in electrographic elements which may be employed in such processes, a basic explanation of the process is useful in understanding the invention. Basically, electrostatic recording is accomplished by depositing a pattern of electrical charge upon the surface of the dielectric layer of the recording element, which charge pattern is made visible by bringing the element into contact with a suitable, usually powdered, electrically conductive ink or toner which adheres to the charged areas, and then, if desired, fixing the ink by subjecting the developed recording element to heat and/or pressure.

Electrographic printing processes are generally categorized in one of two ways. In the first or direct electrographic recording process, the information to be recorded is generated by way of an electrically energized stylus or an electrostatic writing tube, commonly referred to as a CRT pin tube, which is in close proximity to the electrographic recording element. Energization of the stylus or the electrostatic writing tube results in the deposition of a charge pattern on the surface of the electrographic recording element which charge pattern is commonly referred to as a "latent image." This charge pattern is then developed by any of the well-known electrostatic developing techniques to form a permanent and visible image or print. In the direct process, the charge pattern is developed or imaged directly upon the surface on which it is formed. Alternatively, in a transfer electrographic recording process, the charge pattern or latent image is originally formed on a surface other than the surface of the electrographic recording element, for example, on the surface of a photoconductive element, and the charge pattern is then transferred to the electrographic recording element in order to enable a permanent visible record to be made of the thus formed latent image. After transfer of the latent image to the electrographic recording element, development of the image is achieved in a manner similar to that employed in a direct process.

Electrophotographic recording elements are also known in the art. These recording elements comprise a base support having coated thereon a layer containing a dielectric resin and a photoconductive material — i.e., one which conducts an electrical charge only when exposed to light. The most commonly employed photoconductive material is zinc oxide.

In an electrophotographic recording process, an overall charge is applied to the surface of the recording element; the charged layer is then exposed to a light pattern causing the charge to be dissipated in the light struck areas and resulting in a charge pattern or latent image remaining on the surface of the recording element. This charge pattern is then developed to form a visible image by the use of a liquid or dry powder toner or ink which adheres to the charged areas and may be fixed thereto by the use of heat and/or pressure.

In either process, it is important that the dielectric resin-containing layer in the recording element be able to accept and retain a high level of charge. If the material either does not initially accept a high level of charge or if the accepted charge is substantially dissipated or lost before a visible image is formed, the recording element is of limited utility in commercial applications.

At present, electrographic and electrophotographic recording elements are prepared from compositions comprising a resin and an organic solvent in which said resin is soluble. Coatings prepared from these organic solvent-based compositions have acceptable electrical properties in most instances. However, the use of organic solvents adds materially to the cost of the coating composition. Additionally, various safety hazards such as fire hazards and health hazards are encountered as a result of the inflammability and toxicity of many of the organic solvents. Attempts have been made to eliminate the organic solvents and utilize an aqueous system involving either emulsion-type or water-soluble resins. Such attempts have generally resulted in products having reduced electrical insulating properties such as charge acceptance and charge retention or products which are extremely sensitive to humidity changes and have poorer properties at increased humidities.

In accordance with the present invention, water-soluble dielectric resins are prepared. These resins are particularly useful in electrostatic and electrophotographic recording elements which accept a high level of charge — i.e., have a high charge acceptance —; which retain a high percentage of that charge for a period of time sufficient to allow light exposure and/or development of the charge pattern to form a visible image —i.e., have a high charge retention —; and which are relatively insensitive to humidity changes.

SUMMARY OF THE INVENTION

In accordance with the present invention, water-soluble dielectric resins are prepared comprising an amine salt of a polyester resin prepared by reacting a dicarboxylic acid with a blend of polyols, said blend comprising a first polyol having the following general formula:

$$H(OR')_bO - \underset{(X)_n}{\underline{\bigcirc}} - (R)_c - \underset{(X)_n}{\underline{\bigcirc}} - O(R'O)_aH$$

wherein

R is an alkylidene group containing from 1 to 4 carbon atoms, a cycloalkylidene group containing 5 to 6 carbon atoms, oxygen, sulfur, or a radical having one of the following formulas:

$$\underset{|}{\overset{|}{C}}=O, \underset{|}{\overset{|}{S}}=O; \text{ or } O=\underset{|}{\overset{|}{S}}=O;$$

c is 0 or 1;
X is halogen or an alkyl radical containing from 1 to 3 carbon atoms;
n is an integer equal to from 0 to 4;
R' is an alkylene group containing from 2 to 4 carbon atoms or the radical $CH_2CH\phi$; and
a and b are integers each of which is equal to at least 1 and the sum of which is equal to about 2
and a second polyol having the following general formula:

$$H(OR')_bO - \underset{(X)_n}{\underline{\bigcirc}} - (R)_c - \underset{(X)_n}{\underline{\bigcirc}} - O(R'O)_aH$$

wherein R, c, X, R', and n are as defined above and a and b are integers each of which is equal to at least 1 and the sum of which is equal to from about 9 to about 16.

The amine salts are particularly useful in the preparation of electrographic and electrophotographic recording elements.

DESCRIPTION OF THE PREFERRED EMBODIMENTS

As mentioned above, water-soluble dielectric resins are prepared in accordance with the present invention. These resins comprise amine salts of polyester resins, said resins comprising the reaction product of a dicarboxylic acid and a blend of polyols.

Each polyol in the blends useful in the preparation of the polyester resin salts of the present invention has the following general formula;

$$H(OR')_bO - \underset{(X)_n}{\underline{\bigcirc}} - (R)_c - \underset{(X)_n}{\underline{\bigcirc}} - O(R'O)_aH$$

wherein

R is an alkylidene group containing from 1 to 4 carbon atoms, a cycloalkylidene group containing 5 or 6 carbon atoms, oxygen, sulfur, or a radical having one of the following formulas:

$$\underset{|}{\overset{|}{C}}=O, \underset{|}{\overset{|}{S}}=O; \text{ or } O=\underset{|}{\overset{|}{S}}=O;$$

c is 0 or 1;
X is halogen or an alkyl radical containing from 1 to 3 carbon atoms;
n is an integer equal to from 0 to 4;
R' is an alkylene group containing from 2 to 4 carbon atoms or the radical $CH_2CH\phi$; and
a and b are integers each of which is equal to at least one.

However, in accordance with the present invention, it has been found to be critical that the polyester resin be prepared from a blend comprising a first polyol wherein the sum of a and b in the above formula is equal to about 2 and a second polyol, hereinafter referred to as the modifying polyol, in which the sum of a and b is equal to from about 9 to about 16.

It has also been found to be critical to first prepare the polyol blend and to react the resulting blend with the dicarboxylic acid. Satisfactory results are not achieved by preparing two polyester resins and, subsequently, combining the resins.

The amount of each polyol in the blend has not been found to be narrowly critical to the preparation of the dielectric resins. However, as is explained below, by controlling the type and amount of the second or modifying polyol in the blend, the electrical properties of the resins and of coatings prepared therefrom may be modified.

The polyols employed in the blends of the present invention may be prepared by reacting an alkylene oxide, such as ethylene oxide or propylene oxide, or styrene oxide with a dihydric phenol having the following general formula:

$$HO - \underset{(X)_n}{\underline{\bigcirc}} - (R)_c - \underset{(X)_n}{\underline{\bigcirc}} - OH$$

wherein R, c, X and n are as defined above. The sum of a and b in the previous formula is determined by the number of mols of alkylene oxide or styrene oxide added per mol of the dihydric phenol. Thus, in preparing the polyols useful in the blends, an average of from 2 mols of alkylene oxide or styrene oxide should be reacted with each mol of the dihydric phenol to prepare the first polyol and an average of from about 9 to about 16 mols of alkylene oxide or styrene oxide should be reacted with each mol of the dihydric phenol to prepare the second polyol.

The amount of each polyol in the blend employed in the preparation of the polyester resins depends upon the particular second or modifying polyol employed as well as the properties desired in the final product.

To achieve the preferred properties, the following polyol blends are preferred:

If the modifying or second polyol is one in which the sum of a and b in the above formula is equal to about 9, from about 10 mol percent to about 20 mol percent of the total polyol in said blend should be the modifying polyol.

If, however, the sum of a plus b in the modifying polyol is equal to about 16, from about 2 mol percent to about 4 mol percent of the modifying polyol should be employed.

Additional amounts of the above-mentioned polyols may be employed with adversely affecting the preparation of water-soluble derivatives from the resulting product. However, as the amounts of modifying polyol are increased, the resistivity and dielectric properties of the resin decrease. Also, it has been found that, if too much modifying polyol is employed, coatings prepared from said resins are somewhat tacky and, therefore, undesirable for most commercial applications. The upper limit of any given modifying polyol depends upon the sum of $a$ and $b$ in the above polyol. Generally, as this sum increases, the maximum amount of the polyol which may be employed is decreased.

Preferred dielectric properties, including charge acceptance and charge retention when used in electrostatic recording elements, are achieved with resins having a resistivity, expressed as $\log_{10}\rho\epsilon$, equal to at least about 15. In this regard, resistivity is determined as follows:

The charged dielectric resin-containing coating is represented as a parallel circuit containing a resistance and capacitance. Using the Stati-Tester apparatus, a charge is placed on the dielectric layer by a corona and the voltage at any later time is determined from a time based chart recording of the Stati-Tester output. The rate of decay of the charge plate is given by the following expression:

$$\frac{-dQ}{dt} = \frac{Q}{RC}$$

where Q is the charge on the surface of the dielectric layer and R and C are the resistance and capacitance, respectively. Since $Q = CV$, where V is the potential across the layer, $$\frac{-1}{V}\frac{dV}{dt} = \frac{1}{RC}$$

where $t$ is the time. Integrating the above expression, $$\ln V = \ln V_o - \frac{t}{RC}$$

where $t$ is the time interval between $V_o$, the initial voltage and V. Substituting $\rho\epsilon\epsilon_o$ for RC, $$\ln V = \ln V_o - \left(\frac{1}{\rho\epsilon\epsilon_o}\right)t$$

The values of V at the selected time intervals were plotted on semi-log paper as a function of the time interval. A straight line of best fit was then drawn through the data points. The slope of this line gave the value of $\rho\epsilon\epsilon_o$ where $\rho$ is the resistivity, $\epsilon$ is the dielectric constant and $\epsilon_o$ is a constant equal to $8.85 \times 10^{-14}$ farad/cm. From this, $\log_{10}\rho\epsilon$ was calculated.

In accordance with the present invention, resins having preferred resistivity values are prepared from the above-mentioned polyol blends.

As will be appreciated by those skilled in the art, modifying polyols wherein the sum of $a$ plus $b$ is equal to greater than about 16 may also be employed in accordance with the present invention. However, as this sum is increased, the amount of modifying polyol employed must be reduced and will quite rapidly reach such a low level as to be particularly difficult to achieve on a commercial scale. Also, as this sum increases, the resins become more tacky resulting in undesirable properties in the dielectric layers. Also, where the sum of $a$ plus $b$ is equal to less than about 9, it has been found that water-soluble derivatives of the resulting resins are not readily prepared.

The polyester resins useful in the present invention are prepared from the resulting polyol blend by reacting the polyol blend with an approximately equimolar amount of a dicarboxylic acid selected from the group consisting of alpha-unsaturated dicarboxylic acids and aromatic dicarboxylic acids. Representative alpha-unsaturated dicarboxylic acids which may be used to carry out this esterification reaction include, for example, maleic acid and fumaric acid. Representative aromatic dicarboxylic acids which may be employed include, for example, phthalic acid, isophthalic acid, and terephthalic acid. Anhydrides of these acids, such as maleic anhydride and phthalic anhydride, may also be employed. The acid employed in the esterification reaction may also contain a minor amount of a saturated acid, a second aromatic acid or another unsaturated aliphatic acid. If a mixture of acids is employed, it is preferred that at least about 80 mol percent of the acid be an alpha-unsaturated dicarboxylic acid or an aromatic dicarboxylic acid as described above. The preferred polyester resins for use in the present invention are those prepared from alpha-unsaturated dicarboxylic acid.

The reaction of the polyol and the dicarboxylic acid may be performed in an inert atmosphere and at moderate temperatures and substantially atmospheric pressures during the early stage, thus minimizing the loss of dicarboxylic acid by volatilization. As the reaction proceeds, the temperature may be increased and the pressure reduced. An esterification catalyst may be used, although it is generally preferred to carry out the reaction in the absence of excessive amounts of catalyst to avoid contamination of the final resinous product. Where an unsaturated dicarboxylic acid is used, it is usually desirable to include a small amount of a polymerization inhibitor such as hydroquinone or pyrogallol. The procedure employed to prepare the polyesters useful in this invention generally includes heating to about 200°C. for a period of time during the course of the reaction. The polyesters useful in accordance with the present invention are those having acid numbers equal to from about 25 to about 55. For this reason, the reaction is stopped when a sample removed therefrom has an acid number within this range. As used herein, and as is well known to those skilled in the art, the acid number of the resin is determined by measuring the number of milligrams of potassium hydroxide required to neutralize one gram of resin. Also, as mentioned above, the ratio of carboxyl groups to hydroxyl groups in the reaction mixture employed in preparing the polyester resins useful in the present invention is preferably about 1. However, ratios as low as about 0.8 and as high as about 1.2 can also be employed.

The preferred polyester resins employed in carrying out the present invention are prepared from blends of polyoxyalkylene bisphenol A fumarates such as a polyoxypropylene bisphenol A fumarate containing an average of 2.2 oxypropylene groups per mol of the bisphenol A together with a polyoxypropylene bisphenol A fumarate containing an average of 9 oxypropylene groups per mol of the bisphenol A. As is well known in the art, bisphenol A refers to the following compound:

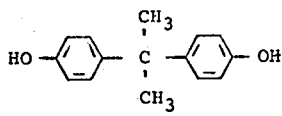

In accordance with the present invention, it has been found that water-soluble dielectric resins may be prepared by reacting one of the above-mentioned polyester resins with an amine as hereinafter defined.

The amines which may be employed include any amine which has a boiling point below the temperature at which the resin will be cured in its intended application. Preferred results are achieved with amines having a boiling point of less than about 100°C. Representative amines which may be employed include, for example, methylamine, ethylamine, propylamine, isopropylamine, n-butylamine, isobutylamine, sec. butylamine, tert. butylamine, isoamylamine, sec. amylamine, tert. amylamine, dimethylamine, diethylamine, diisopropylamine, trimethylamine, triethylamine, vinylamine, pyrrolidine, and morpholine.

Although either primary, secondary, or tertiary amines may be utilized, preferred resins are prepared from tertiary amines. These do not generally result in any undesirable side reactions such as the breakdown of the polymer chain or the formation of stable amides with the polyester resin. Especially preferred results are achieved with triethylamine.

The amount of amine employed should be at least sufficient to neutralize all of the acidity of the polyester resins. With the preferred amines of the present invention, the minimum amount of amine required to prepare water-soluble dielectric resins may be determined from the following formula:

$$x = \frac{AN(MWA)}{56}$$

wherein
AN is the acid number of the polyester resin,
MWA is the molecular weight of the amine, and
$x$ is the milligrams of amine required per gram of resin.

Thus, if it is desired to prepare a water-soluble resin from triethylamine (molecular weight of 101) and a polyester resin having an acid number of 30.8, $$x = \frac{30.8(101)}{56} = \frac{3111}{56} = 55$$

at least 55 mg. of triethylamine should be reacted with each gram of the resin to prepare the water-soluble derivative.

Although more than the minimum amount of amine required to neutralize all of the acidic functionality of the resin may be utilized, no further advantage is gained thereby and it is not, therefore, preferred to utilize excess amine.

The preparation of the water-soluble dielectric resins is preferably carried out by reacting the amine and the polyester resin in water resulting directly in an aqueous solution of the dielectric resin. Preferably, an aqueous solution of the amine is prepared first and the polyester resin as a finely divided powder is added thereto and the resulting mixture stirred until complete solution results. Alternatively, the water-soluble resin may be prepared in another solvent from which the final resin may be recovered or the resin may be removed from the aqueous solution such as by precipitation. If an organic solvent is utilized, the solvent should be one which does not interfere with the formation of the desired resin and in which at least one of the reactants — i.e., amine or resin — and the final product is soluble.

As mentioned above, the water-soluble dielectric resins prepared in accordance with the present invention have been found to be particularly useful in the preparation of electrostatic recording elements. In preparing these materials, the resin solution is coated either alone in the case of an electrographic material or together with a photoconductive material if an electrophotographic element is desired onto a suitable base support.

The base support used to prepare the electrographic or electrophotographic recording elements of the present invention may be any one of a number of base supports conventionally employed in the electrographic recording elements. Representative base supports which may be employed include, for example, metal foil, an electrically conductive paper, an electrically conductive film, and electrically conductive cloth. Of these, it is preferred to employ an electrically conductive paper.

When a base support other than a metal foil is employed, electrical conductivity can be imparted to the base by impregnating or coating the base with any of the compositions or materials which have previously been employed to impart electrical conductivity to such bases. Illustrative of such materials are materials such as carbon black; inorganic electrolytes such as sodium chloride, calcium chloride, and lithium chloride; and electrically conductive resinous polymers such as resinous polymers of quaternary ammonium salts and the like. Since materials such as carbon black impart a color to the base which might be considered to be objectionable and materials such as inorganic electrolytes are somewhat dependent on the ambient relative humidity for their effectiveness as conductive agents, the use of electrically conductive resinous polymers to impart electrical conductivity to the base supports is preferred. Examples of such polymers can be found, for example, in U.S. Pat. No. 3,011,918, which relates to homopolymers and copolymers of vinylbenzyl quaternary ammonium compounds and papers coated with such compounds. Other compounds which are useful for this purpose include, for example, polymers of vinyl pyridine quaternized with aliphatic esters, such as a polymer of vinyl pyridine which has been quaternized with diethyl sulfate.

The recording elements of the present invention are prepared by coating a layer comprising one of the above-described polyester resins on any of the above-mentioned base supports. This coating operation may be carried out by techniques which are well known in the art. Additives which are conventionally employed in the preparation of electrographic recording elements may also be included in the dielectric layer. These additives include, for example, whitening agents and toothing agents. If an electrophotographic recording element is desired, the dielectric resin layer also contains one or more photoconductors and, if desired, sensitizers for the photoconductor. Any of the inorganic or organic photoconductive materials known in the art may be employed.

In preparing the recording elements, the aqueous solution of the polyester resin and any additives are coated onto a suitable base support and the material dried to remove the solvent. It is believed that during the drying procedure the amine becomes volatile and is removed from the coating allowing the resin to cure as it would if the amine had not been utilized. The amount of resin employed in the preparation of said elements may be varied over a wide range depending upon the desired properties and intended application of the electrographic recording element. However, for most applications, it has been found an amount of resin which will result in a coating weight of from about 0.5 to about 10 pounds per ream (3,000 square feet) is preferred. Especially preferred results are achieved at coating weights equal to from about 1 to about 5 pounds per ream.

As compared to the previously available electrographic and electrophotographic recording elements, which required the use of organic solvents in their preparation, materials prepared in accordance with the present invention may be prepared from an aqueous solution and have been found to have good charge acceptance and charge retention properties.

Charge acceptance is measured by recording the amount of voltage on the electrographic recording element immediately after exposure to a source such as a corona discharge.

Charge retention is measured by recording the amount of voltage remaining on the recording element after a predetermined period of time. This property is generally defined in terms of the percentage of initial charge retained after x seconds or minutes.

As mentioned above, in an electrographic or electrophotographic recording or printing process, it is important that the recording element accept and retain a high charge. In this regard, it should be noted that both the charge acceptance and charge retention are frequently related to the amount of dielectric or insulating resin employed in the layer of the recording element. Thus, in addition to having high charge acceptance and charge retention properties, it is desirable to achieve these properties at a relatively low coating weight as is possible with the resins which have been found to be useful for this purpose in accordance with the present invention.

In order to describe the present invention so that it may be more clearly understood, the following examples are set forth. These examples are set forth primarily for the purpose of illustration and any enumeration of detail contained therein should not be interpreted as a limitation on the concept of the present invention.

In the examples, the following standard tests were employed:

Charge acceptance was measured by a Most Stati-Tester available from M. K. Associates, Boston, Massachusetts, and is expressed in terms of volts.

Resistivity was measured as described above and is expressed in terms of $\log_{10} \rho \epsilon$.

Coating weight was determined by weighing a sample of the electrographic recording element, subtracting the weight of the base support, and calculating the weight of the coating in pounds per ream.

Also, in the examples, the following materials were employed:

Polyol A refers to polyoxypropylene(2.2)bis(4-hydroxy phenyl)propane. This polyol was prepared by reacting 2.2 mols of propylene oxide with 1 mol of bisphenol A.

Polyol B refers to polyoxypropylene(9)bis(4-hydroxy phenyl)propane.

Polyol C refers to polyoxypropylene(16)bis(4-hydroxy phenyl)propane.

EXAMPLE 1

Preparation of Polyester Resin

Into a 3-liter reaction flask equipped with a stirrer, Liebig type condenser, nitrogen inlet tube, thermometer, and heating mantle, there were added 1,570.7 grams (90 mol percent) of Polyol A and 370.9 grams (10 mol percent) of Polyol B. The resulting reaction mixture was heated to 60°C. at which point the polyol blend was fluid. At this time, there was added 558.4 grams of fumaric acid. Nitrogen gas was introduced continuously during the course of the reaction. When the addition was completed, the temperature of the reaction mixture was increased slowly to 208°C. When the acid number was 30.8, a 200 gram sample was removed. The polyester resin was a light yellow solid at room temperature.

Preparation of Water-soluble Resin

Into a suitable reaction vessel equipped with a stirrer, there were added 80 grams of water and 1.1 grams of triethylamine. 20 grams of the polyester resin were finely ground with dry ice and the resulting fine powder was added slowly to the water/amine solution while stirring continuously. Stirring was continued for about 1 hour at the end of which time there resulted a clear solution of the resin.

Preparation of Electrostatic Recording Elements

The resin solution prepared above was coated on Fletcher Tek conductive base paper, dried for 2 – 3 minutes at 100°C. and stored at room temperature and humidity for 4 – 5 hours. When evaluated, this product had the following properties:

| | |
|---|---|
| Coating weight (pounds/ream) | 3.1 |
| Charge acceptance (volts) | 72 |
| Resistivity ($\log_{10} \rho \epsilon$) | 15.5 |

A second electrostatic recording element was prepared by combining 50 grams of the resin solution prepared above and 10 grams of lithopone, which is essentially a stoichiometric mixture of zinc sulfide and barium sulfate. The mixture was agitated for 100 seconds in a Waring high-speed blender. The resulting mixture was coated on Fletcher Tek conductive base paper, dried for 2 – 3 minutes at 90°C. and stored at room temperature and humidity for 24 hours before testing. When evaluated, this material had the following properties:

| | |
|---|---|
| Coating weight (pounds/ream) | 5.6 |
| Charge acceptance (volts) | 140 |
| Resistivity ($\log_{10} \rho \epsilon$) | 15.2 |

EXAMPLE 2

A sample of the polyester resin prepared in Example 1 was removed from the reaction flask when the acid number was 41.1.

Into a 250 ml. reaction flask equipped with a stirrer and a heating mantle, there were added 40 grams of distilled water and 4 grams of triethylamine. There was then added, over a period of 5 minutes, 40 grams of the finely powdered polyester resin. The resulting reaction mixture was heated to about 45°C. and an additional 40 grams of water was added. The mixture was stirred and heated at 40°– 50°C. until a clear solution resulted at which time it was cooled to room temperature.

The resulting resin solution is useful as a dielectric resin in electrographic and electrophotograhic recording elements.

EXAMPLE 3

A sample of the polyester resin prepared in Example 1 was removed from the reaction flask when the acid number was 38.3.

Into a 250 ml. reaction flask equipped with a stirrer and a heating mantle, there were added 50 grams of distilled water and 6.75 grams of triethylamine. To the resulting solution, there was added 50 grams of the finely powdered polyester resin. The resin was added over a period of time in several increments with additional water being added when required to facilitate stirring of the reaction mixture. The total amount of water employed, including the 50 grams of water added initially, was equal to 100 grams. There resulted a clear amber-colored solution of the dielectric resin.

The resin solution is useful in the preparation of electrographic and electrophotographic recording elements.

EXAMPLE 4

A sample of the polyester resin prepared in Example 1 was removed from the reaction flask when the acid number was 52.2.

Into a suitable reaction vessel equipped with a stirrer, there were added 80 grams of water and 1.87 grams of triethylamine. 20 grams of the polyester resin were finely ground with dry ice and the resulting fine powder was added slowly to the water/amine solution while stirring continuously. Stirring was continued for an additional 4 hours and the resin solution was allowed to roll overnight in a closed jar. At the end of this time, there resulted a slightly hazy, amber-colored solution of the resin.

The resin solution prepared above was coated on Fletcher Tek conductive base paper, dried for 2 to 3 minutes at 100°C. and stored at room temperature and humidity for 4 to 5 hours. When evaluated, this product had the following properties:

| | |
|---|---|
| Coating weight (pounds/ream) | 5.6 |
| Charge acceptance (volts) | 188 |
| Resistivity ($\log_{10}\rho\epsilon$) | 15.2 |

A second electrostatic recording element was prepared by combining 50 grams of the resin solution prepared above and 10 grams of lithopone. The mixture was agitated for 100 seconds in a Waring high-speed blender and coated on Fletcher Tek conductive base paper. After drying for 2 to 3 minutes at 90°C. and storing at room temperature and humidity for 24 hours, the product was evaluated and had the following properties:

| | |
|---|---|
| Coating weight (pounds/ream) | 5.6 |
| Charge acceptance (volts) | 298 |
| Resistivity ($\log_{10}\rho\epsilon$) | 14.9 |

EXAMPLE 5

A sample of the polyester resin prepared in Example 1 was removed from the reaction flask when the acid number was 52.2.

Into a suitable reaction vessel, there were added 50 grams of water and 1.62 grams of morpholine. 20 grams of the polyester resin were finely ground with dry ice and the resulting fine powder was added slowly to the water/amine solution while stirring continuously. After 30 minutes of stirring, an additional 30 grams of distilled water were added and the stirring was continued until the resin had completely dissolved. At the end of this time, there resulted a slightly hazy, yellow-white solution of the morpholine salt of the polyester resin.

The resin solution prepared above was coated on Fletcher Tek conductive base paper, dried for 2 to 3 minutes at 100°C. and stored at room temperature and humidity for 4 to 5 hours. When evaluated, this product had the following properties:

| | |
|---|---|
| Coating weight (pounds/ream) | 3.8 |
| Charge acceptance (volts) | 193 |
| Resistivity ($\log_{10}\rho\epsilon$) | 15.3 |

A second electrostatic recording element was prepared by combining 50 grams of the resin solution prepared above and 10 grams of lithopone in a Waring high-speed blender and agitating for 100 seconds. The resulting mixture was coated on Fletcher Tek conductive base paper, dried for 2 to 3 minutes at 90°C., and stored at room temperature and humidity for 24 hours before testing. When evaluated, this material had the following properties:

| | |
|---|---|
| Coating weight (pounds/ream) | 6.5 |
| Charge acceptance (volts) | 257 |
| Resistivity ($\log_{10}\rho\epsilon$) | 15.0 |

EXAMPLE 6

Preparation of Polyester Resin

Into a reaction flask as described in Example 1, there was added 1,742 grams (97 mol percent) of Polyol A and 170 grams (3 mol percent) of Polyol C. The resulting reaction mixture was heated to 60°C. at which point the polyol blend was fluid. At this time, there was added 586 grams of fumaric acid. When the addition was completed, the temperature of the reaction mixture was increased slowly to 208°C. When the acid number was 45.4, a 200 gram sample was removed.

Preparation of Water-soluble Resin

Into a suitable reaction vessel equipped with a stirrer, there were added 50 grams of water and 2.0 grams of triethylamine. 20 grams of the polyester resin were finely ground with dry ice and the resulting fine powder was added slowly to the water/amine solution while stirring continuously. There was then added an additional 30 grams of distilled water and stirring was continued for a total of about 4 hours. At the end of this time, there resulted an amber-colored solution having a low viscosity.

Preparation of Electrostatic Recording Element

The resin solution prepared above was coated on Fletcher Tek conductive base paper, dried for 2 to 3 minutes at 100°C. and stored at room temperature and humidity for 4 to 5 hours. When evaluated, this product had the following properties:

| | |
|---|---|
| Coating weight (pounds/ream) | 4.0 |
| Charge acceptance (volts) | 147 |
| Resistivity ($\log_{10}\rho\epsilon$) | 15.8 |

A second electrostatic recording element was prepared by combining 50 grams of the resin solution prepared above and 10 grams of lithopone. The mixture was agitated for 100 seconds in a Waring high-speed blender. The resulting mixture was coated on Fletcher Tek conductive base paper, dried for 2 to 3 minutes at 90°C. and stored at room temperature and humidity for 24 hours before testing. When evaluated, this material had the following properties:

| | |
|---|---|
| Coating weight (pounds/ream) | 7.1 |
| Charge acceptance (volts) | 253 |
| Resistivity ($\log_{10}\rho\epsilon$) | 15.0 |

EXAMPLE 7

Preparation of Polyester Resin

Into a reaction flask as described in Example 1, there were added 1,427.4 grams (85 mol percent) of Polyol A and 535.3 grams (15 mol percent) of Polyol B. The resulting reaction mixture was heated to 60°C. at which point the polyol blend was fluid. At this time, there was added 537.3 grams of fumaric acid. Nitrogen gas was introduced continuously during the course of the reaction. When the addition was completed, the temperature of the reaction mixture was increased slowly to 208°C. When the acid number was 34.6, a 200 gram sample of the polyester resin was removed.

Preparation of Water-soluble Resin

Into a suitable reaction vessel equipped with a stirrer, there were added 50 grams of distilled water and 4.67 grams of triethylamine. There was then slowly added 50 grams of the polyester resin as a fine powder. While stirring, there was added an additional 100 grams of water. After stirring for about 6 hours, there resulted a clear solution of the resin.

The resulting resin solution is useful as a dielectric resin in electrographic and electrophotographic recording elements.

EXAMPLE 8

A sample of the polyester resin prepared in Example 7 was removed from the reaction flask when the acid number was 38.3.

Into a suitable reaction flask, there was added 50 grams of distilled water and 4.27 grams of triethylamine. There was then added 50 grams of the finely powdered polyester resin. The resulting reaction mixture was stirred for about 6 hours during which time an additional 50 grams of water were added. At the end of this time, there resulted a clear solution of the resin.

The resulting resin solution is useful as a dielectric resin in the preparation of electrographic and electrophotographic recording elements.

EXAMPLE 9

Preparation of Polyester Resin

Into a reaction flask as described in Example 1, there were added 1,294.5 grams (80 mol percent) of Polyol A and 687.7 grams (20 mol percent) of Polyol B. The resulting reaction product was heated to 60°C. at which point the polyol blend was fluid. At this time, there was added 517.7 grams of fumaric acid. Nitrogen gas was introduced continuously during the course of the reaction. When the addition was completed, the temperature of the reaction mixture was increased slowly to 208°C. When the acid number was 31.9, a 200 gram sample of the polyester resin was removed.

Preparation of Water-soluble Resin

Into a suitable reaction vessel equipped with a stirrer, there were added 50 grams of distilled water and 4.3 grams of triethylamine. There was then added 50 grams of the polyester resin described above as a finely divided powder. After the resin addition was completed, there was added 20 grams of water and the reaction mixture was stirred for 3 ½ hours. After standing for 16 hours, there was added an additional 10 grams of distilled water and the reaction mixture was stirred for an additional hour. At the end of this time, there resulted a clear solution of the resin.

The resulting resin solution is useful as a dielectric resin in the preparation of electrographic and electrophotographic recording elements.

EXAMPLE 10

A coating composition is prepared comprising:
50 grams of the resin solution prepared in Example 1;
80 grams of Photox 80, a zinc oxide available from New Jersey Zinc Co.;
0.8 gram of a dye solution; and
20 grams of water.

The dye solution employed is a 1% by weight solution in methanol of the following dyes in the following amounts:
27 grams of Bromophenol Blue
42 grams of Sodium Fluorescein
28 grams of Alizarine Cyanine Green
3 grams of Auramine O This composition is coated, by means of a wirewound rod, onto a metal foil to produce an electrophotographic recording element.

What is claimed is:

1. An electrophotographic recording element comprising a base support having coated thereon a layer comprising a photoconductive material and an amine salt of a polyester resin said resin comprising the reaction product of a dicarboxylic acid or an anhydride thereof, provided that at least 80 mol percent of said acid or anhydride is an alpha unsaturated dicarboxylic acid, an anhydride thereof, an aromatic dicarboxylic acid or an anhydride thereof, and a polyol blend comprising a first polyol having the following formula:

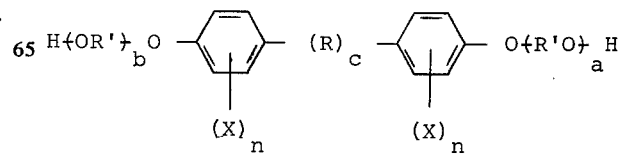

wherein
R is an alkylidene group containing from 1 to 4 carbon atoms, a cycloalkylidene group containing 5 or 6 carbon atoms, oxygen, sulfur, or a radical having one of the following formulas:

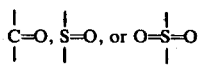

c is 0 or 1;
X is halogen or an alkyl radical containing from 1 to 3 carbon atoms;
n is an integer equal to from 0 to 4;
R' is an alkylene group containing from 2 to 4 carbon atoms or the radical $CH_2CH\phi$; and
a and b are integers each of which is equal to at least 1 and the sum of which is equal to about 2, provided that the sum must be equal to at least 2.0;
and a second polyol having the following general formula:

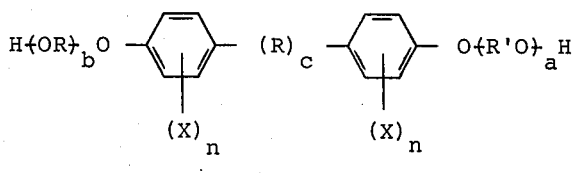

wherein
R, c, X, R', and n are as defined above and a and b are integers each of which is equal to at least 1 and the sum of which is equal to from about 9 to about 16; wherein the amount of acid or anhydride employed is sufficient to introduce from about 0.8 to about 1.2 carboxyl groups per hydroxyl group in the polyol blend and the amine has a boiling point of less than about 100°C.

2. An electrophotographic recording element, as claimed in claim 1, wherein the photoconductive material is zinc oxide.

3. An electrophotographic recording element, as claimed in claim 1, wherein the resin salt is an amine salt of a polyester resin of fumaric acid, polyoxypropylene bis-2,2'(4-hydroxyphenyl)propane containing an average of 2.2 oxypropylene groups per mol of bis-2,2'(4-hydroxyphenyl)propane, and a polyoxypropylene bis-2,2'(4-hydroxyphenyl)propane containing an average of about 9 oxypropylene groups per mol of bis-2,2'(4-hydroxyphenyl)propane.

4. An electrophotographic recording element, as claimed in claim 1, wherein the sum of a and b in said second polyol is equal to about 9.

5. An electrophotographic recording element, as claimed in claim 4, wherein the amount of said second polyol in said blend is equal to from about 10 mol percent to about 20 mol percent of the total amount of polyols in said blend.

6. An electrophotographic recording element, as claimed in claim 1, wherein the sum of a and b in said second polyol is equal to about 16.

7. An electrophotographic recording element, as claimed in claim 6, wherein the amount of said second polyol in said blend is equal to from about 2 mol percent to about 4 mol percent of the total amount of polyols in said blend.

8. An electrophotographic recording element, as claimed in claim 1, wherein the acid number of the polyester resin is equal to from about 25 to about 55.

9. An electrophotographic recording element, as claimed in claim 1, wherein the amine employed in the preparation of the salt is a tertiary amine.

10. An electrophotographic recording element, as claimed in claim 1, wherein thee amine employed in the preparation of the salt is triethylamine.

11. An electrophotographic recording element, as claimed in claim 1, wherein the amount of amine reacted with the polyester resin is at least sufficient to neutralize all of the acidic functionality of said resin.

12. An electrophotographic recording element, as claimed in claim 1, wherein the amount of amine employed is determined from the following formula:

$$x = \frac{AN(MWA)}{56}$$

wherein
AN is the acid number of the polyester resin,
MWA is the molecular weight of the amine, and
x is the milligrams of amine reacted with each gram of the polyester resin.

* * * * *